United States Patent [19]

Molnar

[11] Patent Number: 4,708,899

[45] Date of Patent: Nov. 24, 1987

[54] LAMINATED PANEL WITH INTEGRAL RAISED SCUFF

[75] Inventor: Bela Molnar, London, Canada

[73] Assignee: Protective Plastics Limited, Scarborough, Canada

[21] Appl. No.: 573,147

[22] Filed: Jan. 23, 1984

Related U.S. Application Data

[63] Continuation-in-part of Ser. No. 412,811, Aug. 30, 1982, Pat. No. 4,427,475, which is a continuation of Ser. No. 278,214, Jun. 29, 1981, abandoned.

[51] Int. Cl.⁴ ............................................. B32B 3/30
[52] U.S. Cl. ..................................... 428/60; 428/156; 428/172; 428/190; 428/251; 428/273; 428/421
[58] Field of Search ................. 428/156, 60, 172, 190, 428/273, 31, 290, 422, 421; 264/241, 257, 258; 296/31 P; 105/423

[56] References Cited

U.S. PATENT DOCUMENTS

| | | | |
|---|---|---|---|
| 2,289,489 | 7/1942 | Ennis | 105/423 |
| 2,962,323 | 11/1960 | McBride | 105/423 |
| 4,082,882 | 4/1978 | Weinstein et al. | 264/257 |
| 4,353,857 | 10/1982 | Ray et al. | 264/258 |

*Primary Examiner*—Paul J. Thibodeau
*Attorney, Agent, or Firm*—Ridout & Maybee

[57] ABSTRACT

A laminated panel of the type comprising a laminar core with a unitary covering of resin-impregnated fibrous material on each side, and having a raised scuff extending along one side of the panel is characterized by the fact that the scuff is molded in situ with the resin-impregnated fibrous material so as to form an integral part of the covering on that side of the panel. The scuff has bevelled edges which merge into the surface of the panel thereby eliminating corners and crevices thereat.

6 Claims, 6 Drawing Figures

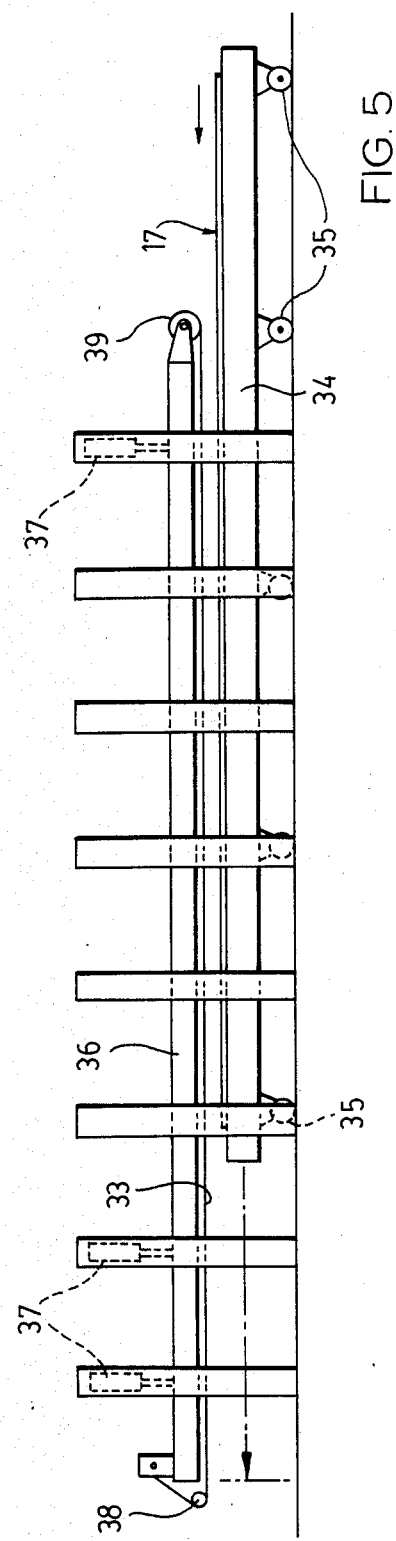
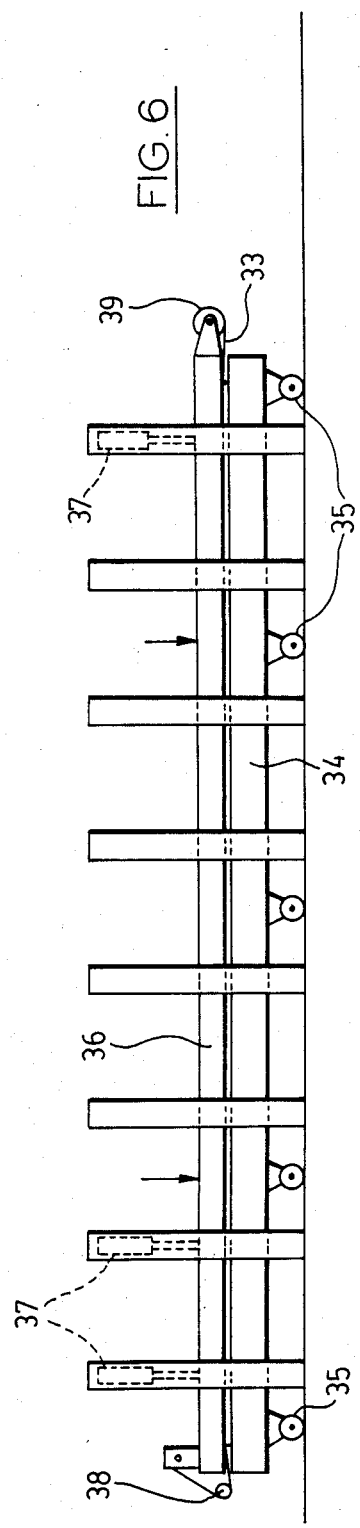

LAMINATED PANEL WITH INTEGRAL RAISED SCUFF

This application is a continuation-in-part of my application Ser. No. 412,811 filed on Aug. 30, 1982, issued as U.S. Pat. No. 4,427,475 dated Jan. 24, 1984, which is a continuation of my application Ser. No. 278,214 filed on June 29, 1981 and now abandoned.

FIELD OF THE INVENTION

The present invention relates to laminated panels and to the manufacture of such panels, the panels being of a type which are commonly used in the construction of truck bodies and trailer bodies applications where they are exposed to weather conditions.

BACKGROUND OF THE INVENTION

In the manufacture of laminated panels in which a core of plywood has a layer of glass fiber reinforced resin bonded on one or both sides of the core it is usually necessary to apply a weather resistant facing layer to the exterior side of the panel to protect the panel from deterioration during use. The facing layer usually consists of a film of weather resistant fluoroplastics material, most commonly a film of polyvinylfluoride such as that sold by the Dupont Corporation under the trade mark "TEDLAR", and which has been treated for adherability on one or both sides. One of the difficulties associated with the manufacture of such panels is that the fluoroplastics film, which is about 1.5 mils thick, tends to wrinkle and crease while it is being applied to the uncured resin layer, and removal of such minor flaws from the film prior to curing is both difficult and time consuming.

U.S. Pat. No. 4,427,475 identified above, the disclosure of which is incorporated herein by reference, relates to an improved method of applying the film whereby this difficulty is overcome.

However, when such panels are to be used in the construction of truck and trailer bodies, regardless of the nature of the exterior facing layer, it is often necessary to protect the interior sides of the panels from damage by handling during construction of the bodies and from damage by loading and unloading when the truck and trailer bodies are in use. The forks of fork lift trucks are a common cause of such damage.

To deal with the problem a raised scuff is often fastened to the interior of the panel, by screws, staples or adhesive, the scuff extending parallel to the bottom edge of the panel for the whole length thereof. The bottom edge of the scuff, which is typically about 24 inches wide is spaced from the bottom edge of the panel by a distance of one to eight inches. The current practice is to prefabricate the scuffs and attach them to the panels, when required, at the required positions. Apart from the additional labour required, this practice has the disadvantage that the scuffs can easily become detached or loosened by impact, when struck by the forks of a fork lift truck, say; it also has a disadvantage which is even more serious in certain applications where hygiene is important, namely that the corners between the scuffs and the panels tend to harbour dirt and perishable fragments, and are not easily cleaned.

SUMMARY OF THE INVENTION

The present invention provides an improved laminated panel construction which overcomes these disadvantages. The invention also provides a process for manufacturing the improved panel.

According to one aspect of the present invention there is provided a laminated panel having at least one straight longitudinal edge and a raised scuff extending parallel to said edge on one side of the panel for the whole length thereof, the panel comprising a laminar core, a first unitary covering of resin-impregnated fibrous material laminated in situ to said one side of the core, a second unitary covering of resin-impregnated fibrous material laminated in situ to the other side of the core, said first covering comprising a sheet of said resin-impregnated fibrous material covering the entire area of said one side of the core and an elongate strip of said resin-impregnated fibrous material superposed thereon and molded in situ onto the sheet to form an integral thickened region of the covering defining said scuff, the longitudinal edges of the strip being bevelled and merging into said sheet.

In cases where it is required, a wrinkle-free facing layer of weather resistant fluoroplastics material may be laminated onto the second (i.e. exterior) unitary covering of resin-impregnated fibrous material.

According to another aspect of the invention, a process for manufacturing the panel comprises assembling in superposed relationship, on a flat hard shaping surface providing a parallel-sided channel having bevelled edges, a laminar core having at least one straight longitudinal edge, the core being positioned so as to extend across said channel with said straight edge lying parallel to the bevelled edges at a predetermined distance therefrom, a first sheet of resin-impregnated fibrous material interposed between the core and said surface and covering the entire area of one side of the core, a second sheet of resin-impregnated fibrous material covering the entire area of the other side of the core, and at least one strip of resin-impregnated fibrous material interposed between the first sheet and said shaping surface, said at least one strip being of the same width as said channel and being positioned so as to extend along the channel to fill same, positioning the assembly horizontally, with said second sheet uppermost, in a press having upper and lower platens while maintaining said superposed relationship on the shaping surface, closing the press, and laminating the assembly under heat and pressure.

In cases where an exterior facing layer of fluoroplastics material is required, this may be applied by the method described in the above-identified U.S. Pat. No. 4,427,475, using the apparatus disclosed therein, the assembly including the fluoroplastics film being laminated under heat and pressure in the one operation.

BRIEF DESCRIPTION OF THE DRAWINGS

In the accompanying drawings:
FIGS. 5 and 6 illustrate two stages in the manufacturing process.

DESCRIPTION OF THE PREFERRED EMBODIMENTS

Figure 1:
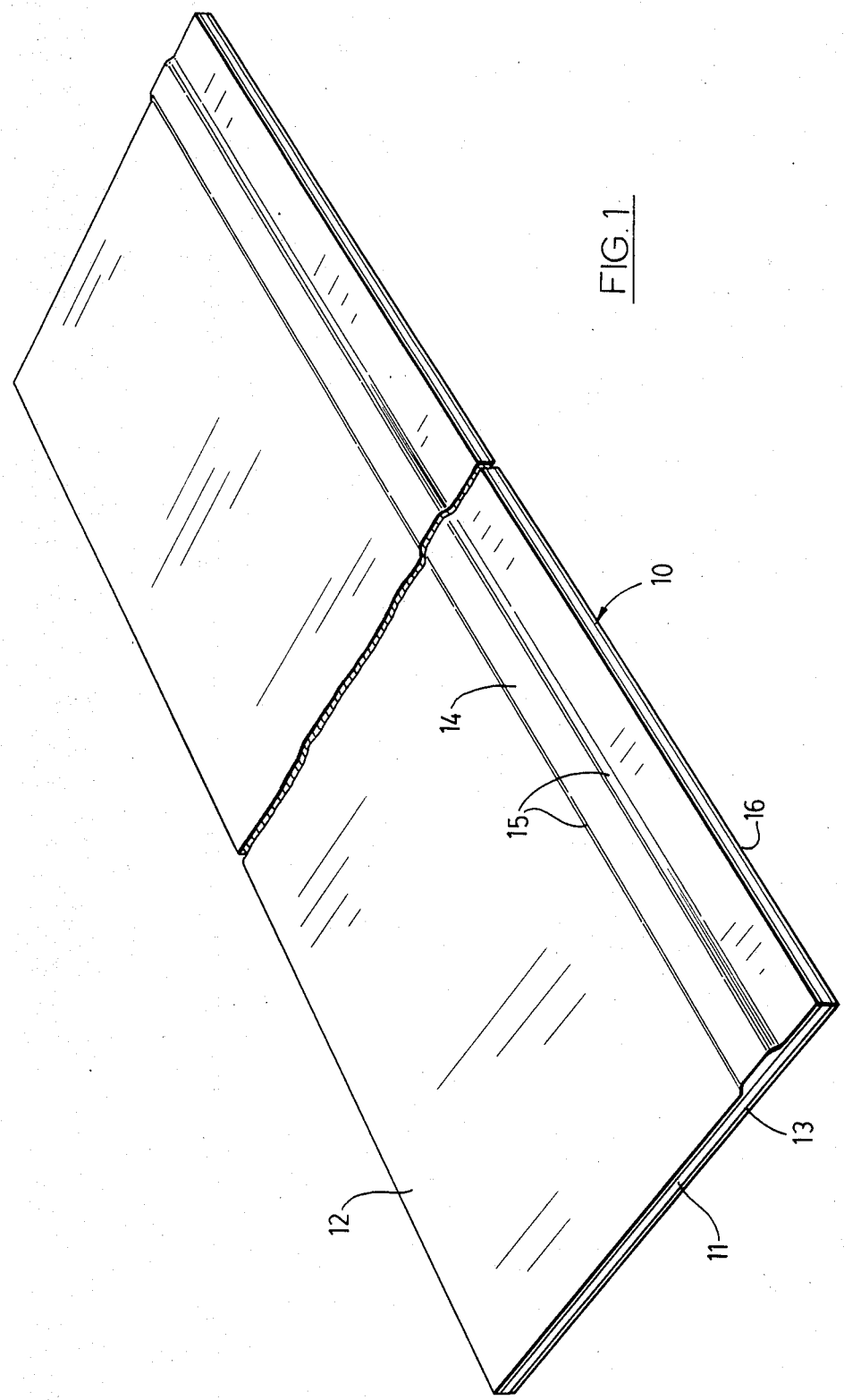
FIG. 1 illustrates the structure of a laminated panel according to the invention.

The finished product is shown in FIG. 1. The product is a laminated panel which in the present example is rectangular, but in any event must have at least one straight longitudinal edge 10, this being the bottom edge of the panel. The dimensions of the panel are typically 10 feet×46 feet. The laminated assembly comprises a laminar core of plywood 11 having a first unitary, i.e. continuous, covering of resin-impregnated fibrous material 12 laminated to one side of the core 11 and a second unitary covering of resin-impregnated fibrous material 13 laminated to the other side of the core. The coverings conform to the rectangular shape and dimensions of the core, and the material is preferably a polyester-impregnated woven glass fiber material of a type commonly used in such applications.

The first covering 12 has an integral raised surface portion 14 which extends for the full length of the panel parallel to the bottom edge 10, and forms the raised scuff on the interior side of the panel. This raised portion 14 is in fact a thickened portion of the first covering 12, being molded in situ therewith so that the material of the raised portion and of the rest of the covering are homogeneous without an interface. A characteristic feature of the raised portion 14 is that it has a flat surface with parallel bevelled edges 15 by which the flat surface merges smoothly into panel surface.

In the illustrated embodiment a wrinkle-free facing layer 16 of fluoroplastics material is laminated in situ onto the second covering 13 to form the exterior surface of the panel.

Figure 2:
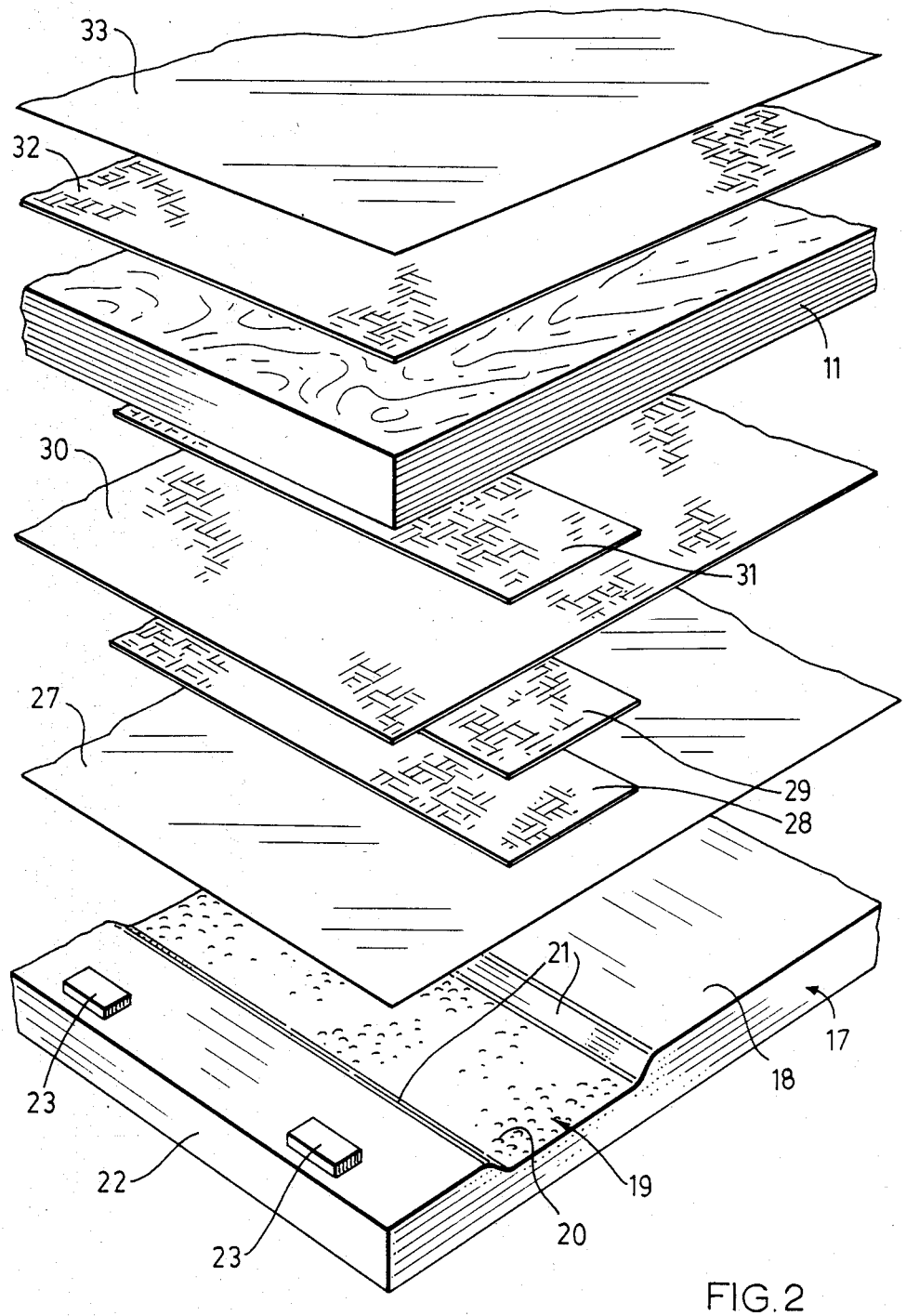
FIG. 2 illustrates the assembly of the panel layers on a caul plate.
Figure 3:
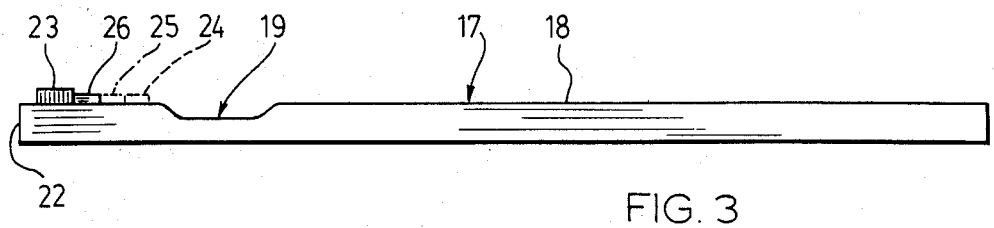
FIG. 3 illustrates a detail of the caul plate.
Figure 4:
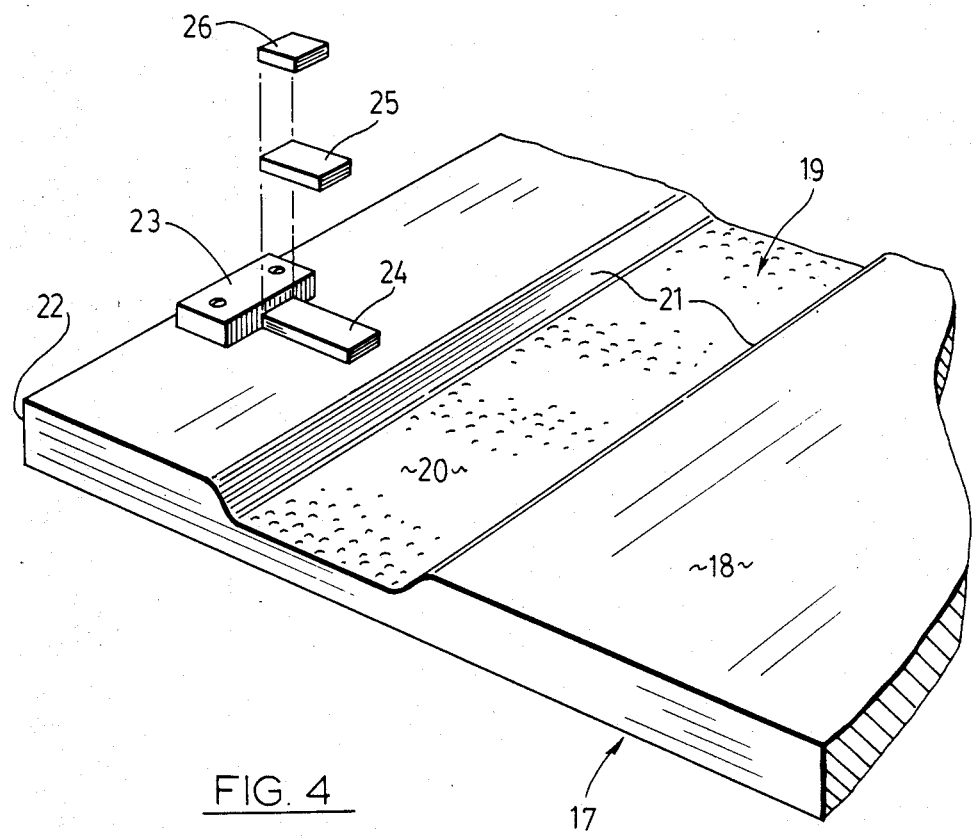
FIG. 4 is a side elevational view of the caul plate.

FIG. 2 shows the assembly of the layers to be laminated to form the panel of FIG. 1, the layers being assembled on a caul plate 17 which provides a hard flat shaping surface 18. Details of the caul plate 17 are shown in FIGS. 3 and 4.

The caul plate 17 is a flat rectangular steel plate adapted to be mounted on the lower platen of a press. The shaping surface 18 is characterized by a parallel-sided shallow channel 19 having an embossed bottom surface 20 and bevelled edges 21. One longitudinal edge 22 of the caul plate is spaced from the nearer of the channel edges 21, which run parallel to it, by about eight inches, and a row of raised stops 23 (only one of which is shown in FIG. 4) are fixed along the caul plate adjacent its edge 22. These stops 23 are used to locate the plywood core 11 with respect to the channel 19 during the assembling process. However, the location of the core with respect to the channel can be adjusted by appropriate selection of spacers 24, 25 and 26 of different sizes, a spacer 24 being shown in its operative position in FIG. 4.

The layers are assembled in the following manner.

First, a release film 27 of MYLAR (trade mark) is laid upon the shaping surface 18 of the caul plate to facilitate removal of the assembly after the lamination process. Then the various components to be laminated are assembled in superposed relationship on top of the release film 27 in the following sequence: one or more strips 28, 29 of the resin-impregnated fibrous material having the same width as the channel 19, a first rectangular sheet 30 of the resin-impregnated fibrous material, at least one further strip 31 of the resin-impregnated fibrous material, the plywood core 11, a second sheet 32 of the resin-impregnated fibrous material, and a film of fluoroplastics material 33. The components are suitably positioned with respect to the channel 19 by means of the stops 23 (FIG. 4), so that the edges which will form the bottom edge of the panel abut against the stops. The strips 28, 29 and 31 are superimposed in registration with the channel 19. Although three such strips are shown in FIG. 2, the number of strips will be chosen to suit the particular manufacturing requirement and must be such that the fibrous material will fill the channel 19 when the assembled layers are pressed onto the caul plate. The assembly is next placed on the lower platen of a laminating press while maintaining the superposed relationship of the components on the surface of the caul plate; the press is closed, and the assembly is laminated under heat and pressure. Thereafter the press is opened and the laminated assembly is removed from the caul plate, the edges of the panel being trimmed.

The first sheet of fibrous material 30 and the strips 28, 29 and 31 are thus molded together in situ to form the first unitary covering 12 (FIG. 1) having the integral raised portion 14. The second sheet 32 is similarly laminated in situ onto the upper surface of the core 11 to form the second unitary covering 13 (FIG. 1), the film 33 being laminated onto the latter to form the facing layer 16.

Referring now to FIGS. 5 and 6, the caul plate 17 on which the laminate components are assembled is mounted horizontally on the lower platen 34 of the laminating press, the shaping surface 18 of the caul plate being uppermost. The platen 34 is equipped with wheels 35, whereby it can be displaced horizontally from its operative position beneath the upper platen 36, to a second position (FIG. 6) where the caul plate is exposed to permit assembly of the laminate components thereon, and whereby it can be reinserted to the operative position in preparation for the laminating process. The upper platen 36 of the press is adapted to be heated by hot water and steam, or electrically, to a temperature in the range 170°–210° F., and is adapted to be raised and lowered by hydraulic rams 37, thereby to be pressed against the lower platen 34 to a pressure of about 30 p.s.i. The lower platen is adapted to be heated to a temperature of about 120° F.

In order to apply the film 33 to the assembly, the film is initially supported between longitudinally spaced support rollers 38, 39 attached to the ends of the upper platen 36, and is stretched longitudinally and laterally, in the manner described in the above-identified patent application, so as to lie in a substantially horizontal plane spaced from the lower face of the upper platen. After the lower platen 34 has been inserted to its operative position, with the caul plate and assembled layers thereon, the upper platen 36 is lowered to bring the film into contact with the uppermost (second) resin-impregnated fibrous sheet 32 while maintaining the spacing of the film from the lower face of the platen. The press is then closed and the assembly is laminated under heat and pressure.

However, the present invention is also applicable to cases in which a wrinkle-free facing layer of fluoroplastics material is not required. In such cases a facing layer may simply be preassembled with the other laminate components, or dispensed with in some cases.

In the present example the core is of ⅜ inch 7-ply Douglas Fir plywood measuring 10×46 feet. The material of the coverings 12, 13 is preferably a polyester-resin-impregnated woven glass fiber material. The glass fiber is a Type 702-24 ounce/yard woven roving impregnated with the resin mixed with a suitable catalyst. The resin system typically has the following composition:

| Ingredients | Parts |
| --- | --- |
| 2T 1008 | 100 |

| Ingredients | Parts |
| --- | --- |
| CaCO$_3$ | 50 |
| Titanox | 2 |
| MEK | 0.5 |

With this system the assembled components are laminated together at the temperature of the press under a pressure of 30 p.s.i., and the laminated panel is then cured in the press for a period from 7 to 25 minutes, preferably 15 minutes.

As will be understood by the man skilled in the art, other resin systems of the thermosetting type may alternatively be used, for example vinyl, epoxy and phenolic resins.

The product is characterized in that the interior (first) covering of the panel is homogeneous throughout, the raised scuff being molded integrally with it, and having bevelled edges which merge into the surface of the panel so as to eliminate corners and crevices which would collect dirt and contaminants difficult to remove.

What I claim is:

1. A laminated panel having at least one straight longitudinal edge and a raised scuff extending parallel to said edge on one side of the panel for the whole length thereof, the panel comprising a laminar core, a first unitary covering of resin-impregnated fibrous material laminated in situ to said one side of the core, a second unitary covering of resin-impregnated fibrous material laminated in situ to the other side of the core, said first covering comprising a sheet of said resin-impregnated fibrous material covering the entire area of said one side of the core and an elongate strip of said resin-impregnated fibrous material superposed thereon and molded in situ onto the sheet to form an integral thickened region of the covering defining said scuff, the longitudinal edges of the thickened region being bevelled and merging into said sheet.

2. A laminated panel according to claim 1, wherein said integral thickened region of the first covering is formed by a plurality of said elongate strips molded in situ onto the sheet of resin-impregnated fibrous material.

3. A laminated panel according to claim 1, wherein the panel is rectangular.

4. A laminated panel according to claim 3, wherein the resin-impregnated fibrous material is a resin-impregnated woven glass fiber material.

5. A laminated panel according to claim 4, wherein the laminar core is of plywood.

6. A laminated panel according to claim 4, further comprising a wrinkle-free facing layer of weather resistant fluoroplastics material laminated onto said second unitary covering.

* * * * *